3,417,115
PROCESS OF PREPARING ORGANOMETALLIC
ISOCYANATES
Walter Stamm, Tarrytown, N.Y., assignor to Stauffer Chemical Company, New York, N.Y., a corporation of Delaware
No Drawing. Filed Feb. 3, 1965, Ser. No. 430,182
12 Claims. (Cl. 260—429.7)

ABSTRACT OF THE DISCLOSURE

A process for preparng organometallic isocyanates by reacting isocyanic acid with an organometallic oxide. The metallic elements are selected from Groups IV and V of the Periodic System. The organic substituents attached to the metallic atom are relatively inert hydrocarbon radicals.

---

This invention relates to organometallic compounds and in particular to organometallic isocyanates. Even more particularly, the invention is concerned with a new and novel process of preparing organometallic isocyanates wherein the metallic atom is taken from the main Groups IV and V of the Periodic System.

Although the organometallic isocyanates are known, relatively little has been published about this class of compounds. Perhaps the earliest reference to an organometallic isocyanate is documented in J. Prakt. Chem., 80, 91 (1860) which describes the preparation of triethyltin isocyanate by reacting silver isocyanate with triethyltin chloride. Apparently the reaction is applicable generally to the synthesis of trialkyltin isocyanates from the corresponding trialkyltin chloride. More recently, organometallic isocyanates have appeared in the patent literature and in this connection reference is made to British Patent 891,861 which discloses phosphorus isocyanates and U.S. Patent 3,113,146 which discloses a group of organometallic isocyanates in which the metallic element is phosphorus, silicon, tin, arsenic, antimony and boron.

It has now been discovered that organometallic isocyanates can be realized by using isocyanic acid as the source of the isocyanate function and a process for the preparation of organometallic isocyanates based on such finding constitutes the principal purpose and object of this invention. Other objects and purposes will become manifest subsequently.

In accordance with the present invention, isocyanic acid is reacted with an organometallic oxide to yield an organometallic isocyanate of the type illustrated by the following chemical formula:

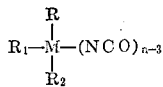

wherein each of R, $R_1$ and $R_2$ represent inert hydrocarbon substituents, preferably an alkyl radical of from 1 to 18 carbon atoms, e.g. methyl, ethyl, n-propyl, isopropyl, isobutyl, n-butyl, n-pentyl, sec.-pentyl, isopentyl, n-hexyl, isohexyl, n-heptyl, sec.-heptyl, n-octyl, isooctyl, n-nonyl, n-decyl, isodecyl, n-undecyl, n-dodecyl, n-tridecyl, n-tetradecyl, pentadecyl, hexadecyl, heptadecyl, octadecyl, and the like; and aryl radical of from 6 to 18 atoms, e.g. phenyl, α-naphthyl, β-naphthyl, biphenylyl, and the like, it being understood that said alkyl and aryl radicals may have attached thereto non-interfering substituents and functional groups such as a chloro group, a fluoro group, an alkoxy group, a phenoxy group, an aryl group, an alkyl group, and the like; M is a metallic element taken from main Groups IV and V of the Periodic System of elements and includes in the case of Group IV silicon, germanium, tin and lead, and in the case of Group V, arsenic, antimony and bismuth, and $n$ is a whole number representing the valence of M.

Typical organometallic isocyanates which can be obtained by the process of the invention include trimethyltin isocyanate, triethyltin isocyanate, tri-n-propyltin isocyanate, tri-n-butyltin isocyanate, tri-isobutyltin isocyanate, tri-n-hexyltin isocyanate, tri-n-heptyltin isocyanate, tri-n-octyltin isocyanate, tri-n-decyltin isocyanate, tri-n-dodecyltin isocyanate, tri-n-tetradecyltin isocyanate, tri-pentadecyltin isocyanate, tri-hexadecyltin isocyanate, tri-phenyltin isocyanate, trianisyltin isocyanate, tri-p-ethoxyphenyltin isocyanate, tribenzyltin isocyanate, tri-alpha-naphthyltin isocyanate, tri-beta-naphthyltin isocyanate, tribiphenylyltin isocyanate, triphenylsilicon isocyanate, triethylsilicon isocyanate, tri-n-octylsilicon isocyanate, tribenzylsilicon isocyanate, tritetradecylsilicon isocyanate, triethylantimony diisocyanate, triisobutylantimony diisocyanate, tri-n-butylantimony diisocyanate, tri-n-octylantimony diisocyanate, tri-n-decylantimony diisocyanate, tritetradecylantimony diisocyanate, triphenylantimony diisocyanate, triisobutylarsenic diisocyanate, triphenylarsenic diisocyanate, tri-n-octylarsenic diisocyanate, tribenzylarsenic diisocyanate, and the like.

As used herein the term "organometallic oxide" refers to both the oxide and its hydrated form, i.e. hydroxide. Suitable organomettalic oxides and hydroxides include the trisubstituted silanols such as the trialkylsilanols, e.g. tri-n-ethylsilanol, tri-n-propysilanol, triisobutylsilanol, tri-n-hexylsilanol, tri-n-octylsilanol, tri-n-dodecylsilanol, tritetradecylsilanol, trioctadecylsilanol, triphenylsilanol, trialkyltin hydroxides, bis(trialkyltin)oxides, bis(triaryltin)oxides, e.g. triethyltin hydroxide, tri-n-butyltin hydroxide, bis(triisobutyltin)oxide, bis(triisooctyltin)oxide, triethylantimony hydroxides and oxides, e.g. triethylantimony dihydroxide, triethylantimony oxide, tri-n-butylantimony oxide, tri-n-octylantimony oxide, triphenylantimony oxide, trialkylarsenic oxide, e.g., triethylarsenic oxide, tri-n-butylarsenic oxide, tribenzylarsenic oxide, and the like. The organometallic oxides and hydroxides of the elements of Groups IV and V of the Periodic System are, generally speaking, known chemical entities, the description and preparation of which can be found in the technical literature and in this connection reference is made to such well-known chemical publications as Chemical Abstracts and the Journal of the American Chemical Society as well as treatises such as A Review of Organotin Compounds by R. K. Ingham et al. in Chemical Reviews, 1960, pp. 459–539.

In carrying out the process of the invention, I have ascertained that excellent results are achieved by contacting the isocyanic acid with the requisite organometallic oxide or hydroxide. Although the reaction conditions depend to some extent on the reactivity of the particular organometallic intermediate, it has been my finding that the process of the invention is preferably conducted by bringing the reactants together in the presence of a inert organic solvent at mildly elevated temperatures. A particularly convenient procedure consists in introducing freshly prepared isocyanic acid into a solution of the organometallic oxide or hydroxide at moderate temperatures while removing by azeotropic distillation the water by-product. Although only a stoichiometric amount of the isocyanic acid is required, it is desirable to employ a slight excess of this reagent usually in the neighborhood of 1 to 20 percent for optimum yields of the organometallic isocyanates. In fact, yields of about 90% were consistently obtained when utilizing about 20% excess free isocyanic acid.

The isolation and purification of the organometallic isocyanates prepared in accordance with the herein described process can be effectuated using any of the common techniques employed in the organic chemistry art and in this connection reference is made to distillation, crystallization, sublimation, and the like. As above pointed out, the process of the invention is conveniently carried out in the presence of a inert, normally liquid organic solvent and for this purpose it has been ascertained that the aromatic and saturated aliphatic liquid hydrocarbons and their chlorinated derivatives are satisfactory, typical examples of which include benzene, chlorobenzene, trichlorobenzene, dichlorobenzene, toluene, chlorotoluene, xylene, mesitylene, hexane, heptane, ligroin, chloroform, carbon tetrachloride, ethylene chloride. Other useful solvent media is provided by the normally liquid ethers, e.g. diethylether, di-n-propylether, anisole, phenetole, as well as the ethers of poylhydroxyalkanes such as ethylene glycol diethylether, ethylene glycol dimethylether, etc. It is, of course, necessary that the solvent media not be too basic since otherwise polymerization of the highly reactive isocyanic acid will take place. Thus, such solvents as quinoline, pyridine, the trialkylamines, e.g. trimethyl or triethylamine, normally cause the isocyanic acid to undergo polymerization to the cyanuric acid derivative with such acidity that the reaction of the isocyanic acid with the organometallic oxide or hyroxide is greatly suppressed. Those skilled in the art will realize that the term "inert organic solvent" excludes those materials which cause polymerization of the isocyanic acid.

That organometallic isocyanates can be obtained by reacting isocyanic acid with an organometallic oxide or hydroxide is surprising since normally one would expect the highly reactive isocyanic acid to undergo trimerization to cyanuric acid in preference to reacting with the organometallic oxide or hydroxide. A typical attitude of the art in this connection is voiced by H. H. Anderson, a recognized authority in Group IV Organometallic Chemistry in J. Org. Chem., 19, 1300 (1954), wherein is found the statement "triethyltin oxide does not react with anhydrous isocyanic acid to give triethyltin isocyanate. Perhaps HNCO polymerizes too rapidly into cyanuric acid, a trimer, for reaction with organotin oxides." It would thus appear that the use of slightly or moderately elevated temperatures is responsible or accounts for the unusual results obtained by means of the herein described process. Instead of merely hastening polymerization of the isocyanic acid as might be expected, the use of slightly elevated temperatures results in a completely different reaction consisting of a condensation of the isocyanic acid with the organometallic oxide to produce an organometallic isocyanate. Although the optimum temperature for bringing about reaction between the isocyanic acid and organometallic oxide is in the neighborhood of 60° C., those skilled in the art will appreciate that this condition may be varied within reasonable limits for successful operation of the invention. In some instances, the organometallic oxide or hydroxide may vary in reactivity towards the isocyanic acid, and in these cases it is conceivable that temperatures perhaps only slightly above room temperature, or even at room temperature itself, may suffice. On the other hand, where the organometallic oxide is sluggish in its reactivity or highly insoluble, then it follows that somewhat higher temperatures will be required to effectuate reaction between the isocyanic acid and organometallic oxide. In other words, while the temperature in the instant invention seems to be the important factor in causing reaction between the isocyanic acid and organometallic oxide in preference to trimerization, it is to be understood that the invention is not limited to some specific and highly artificial temperature range.

Isocyanic acid is a known chemical compound and is conveniently obtained by the pyrolysis of cyanuric acid at 400–500° C. The preparation of isocyanic acid is extensively documented in the chemical and technical literature which can be consulted for details on the preparation of this material.

Reference is now made to the following examples which are inserted for the purpose of illustrating the invention. It is to be pointed out, however, that different modifications in practicing the invention will be evident to those skilled in the art without departing from the spirit or scope of said invention.

Example 1.—Tri-n-butyltin isocyanate

A reaction flask was equipped with a Dean-Stark reflux condenser and stirrer and connected to a hot tube reactor. The flask was charged with a solution of 60 g. (0.2 mole-equivalent of Bu$_2$Sn) of bis-tributyltin oxide in 120 ml. of benzene and then cooled in an ice trap. Approximately 11 g. (0.255 mole) of free isocyanic acid was distilled into the benzene solution from the hot tube reactor under a slow stream of dry nitrogen, in which 16.0 g. (0.12 mole) of cyanuric acid was pyrolyzed at 500° C. The benzene solution was then brought to reflux temperature. At 75–80° C. a vigorous foaming indicated that reaction had commenced. Within 1 hour, 1.2 ml. (0.067 mole) of water was collected in the trap. After 2 hours, about 2.5 g. of cyanuric acid was removed from the benzene solution by filtration. Benzene was flash-evaporated at reduced pressure, and the remaining clear oil was purified by high vacuum distillation. The main fraction distilled at 104–106° (0.3 mm.); $n_D^{22}$=1.489; yield 59.8 g. (90%). Strong infrared bands were at 3.45$\mu$ (CH strech) and 4.56$\mu$ (NCO). Elemental analyses confirmed the structure.

Using the procedure given in Example 1 and equivalent amounts of the requisite organometallic oxide or hydroxide, the following organometallic isocyanates were prepared:

| Ex. No. | | Description |
|---|---|---|
| 2 | Triisobutylantimony diisocyanate | B.P. 122–124° C./0.15 mm.; $n_D^{20}$=1.5128. |
| 3 | Triisobutyltin isocyanate | B.P. 102° C./0.3 mm; $n_D^{21}$=1.488. |
| 4 | Triphenylarsenic diisocyanate | Glassy solid. |
| 5 | Triethyltin isocyanate | B.P. 70° C./0.4 mm. |
| 6 | Tri-n-butylantimony diisocyanate | B.P. 122° C./0.2 mm. |
| 7 | Triphenylsilicon isocyanate | M.P. 96–97° C. |

The organometallic isocyanates are useful chemical entities exhibiting utility in many commercial applications. For instance, the trialkyltin isocyanates have been found to be excellent catalysts for use in the production of polyurethane foams from diisocyanates, glycols or glycolethers, and water. They also possess biocidal activity and in this connection mention is made of their use as foliar and soil fungicides, pre- and post-emergence herbicides and insecticides.

I claim:

1. A method of preparing an organometallic isocyanate wherein the metallic element is selected from the class consisting of the elements of main Groups IV and V of the Periodic System which comprises reacting isocyanic acid with an organometallic oxide, the metallic element thereof having the significance as above defined while the organic substituents attached to the metallic atom are inert hydrocarbon radicals and isolating the so-formed organometallic isocyanate.

2. The method according to claim 1 wherein the reaction is carried out in the presence of an inert, normally liquid organic solvent.

3. The reaction according to claim 1 wherein the method is carried out at moderately elevated temperatures.

4. The method according to claim 2 wherein the inert, normally liquid organic solvent is a liquid aromatic solvent.

5. The method according to claim 4 wherein the aromatic solvent is benzene.

6. The method according to claim 1 wherein the organometallic oxide is tri-n-butyltin oxide and the reaction temperature is at least about 60° C.

7. The method according to claim 1 wherein the organometallic oxide is tri-isobutylantimony oxide.

8. The method according to claim 1 wherein the organometallic oxide is tri-isobutyltin oxide and the reaction temperature is at least about 60° C.

9. The method according to claim 1 wherein the organo metallic oxide is triphenylarsenic oxide.

10. The method according to claim 1 wherein the organometallic oxide is triethyltin oxide.

11. The method according to claim 1 wherein the organometallic oxide is tri-n-butylantimony oxide.

12. The method according to claim 1 wherein the organometallic oxide is triphenylsilicon oxide.

References Cited

Anderson et al., Journal of Organic Chemistry, vol. 19, No. 8, pp. 1300 to 1305, 260–429.7.

TOBIAS E. LEVOW, *Primary Examiner*.

W. F. W. BELLAMY, *Assistant Examiner*.

U.S. Cl. X.R.

260—448.2, 446, 440; 167—22; 252—431